US009769675B2

(12) United States Patent
Cuervo et al.

(10) Patent No.: US 9,769,675 B2
(45) Date of Patent: Sep. 19, 2017

(54) CLOUD-BASED CONNECTIVITY (71) Applicant: Hewlett-Packard Development Company, L.P., Houston, TX (US)

(72) Inventors: Eduardo Alberto Cuervo Laffaye Cuervo, Palo Alto, CA (US); Kyu-Han Kim, Palo Alto, CA (US); Paul T. Congdon, Palo Alto, CA (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 0 days.

(21) Appl. No.: 14/777,451

(22) PCT Filed: Mar. 15, 2013

(86) PCT No.: PCT/US2013/032530
§ 371 (c)(1),
(2) Date: Sep. 15, 2015

(87) PCT Pub. No.: WO2014/143041
PCT Pub. Date: Sep. 18, 2014

(65) Prior Publication Data
US 2016/0021546 A1 Jan. 21, 2016

(51) Int. Cl.
*H04W 16/22* (2009.01)
*H04W 40/02* (2009.01)
(Continued)

(52) U.S. Cl.
CPC ............ *H04W 16/22* (2013.01); *H04L 41/12* (2013.01); *H04W 24/02* (2013.01); *H04W 40/02* (2013.01);
(Continued)

(58) Field of Classification Search
CPC ..... H04W 16/00; H04W 40/02; H04W 40/08; H04W 40/18; H04W 40/24; H04W 28/06;
(Continued)

(56) References Cited

U.S. PATENT DOCUMENTS 6,501,949 B1* 12/2002 Singleton ................ H04W 4/12
455/343.3
7,574,240 B1* 8/2009 Jenkins, IV ...... H04M 1/72525
370/338
(Continued)

FOREIGN PATENT DOCUMENTS

| CN | WO2013/023698 | * | 2/2013 | ............ H04W 24/02 |
| WO | WO-2005/036836 A1 | | 4/2005 | |
| WO | WO-2012024030 | | 2/2012 | |

OTHER PUBLICATIONS

"NTT Communications Chooses Juniper Networks Mobile Security Solutions to Enable "bring Your Own Device" Service," Jul. 10, 2012, pp. 1-2, Juniper Networks.
(Continued)

*Primary Examiner* — Warner Wong
(74) *Attorney, Agent, or Firm* — Hewlett Packard Enterprise Patent Department (57) ABSTRACT

A cloud-based connectivity system is disclosed. The system includes a plurality of wireless devices and a computing device connected to at least one of the wireless devices. The computing device includes a control unit to receive context information from each of the plurality of wireless devices, to determine future consumption patterns for each of the plurality of wireless devices by using the received context information, to create a connectivity representation for the plurality of wireless devices, and to determine an optimal network topology for the plurality of wireless devices.

13 Claims, 6 Drawing Sheets

(51) Int. Cl.
*H04W 40/24* (2009.01)
*H04W 48/18* (2009.01)
*H04L 12/24* (2006.01)
*H04W 24/02* (2009.01)
*H04W 84/00* (2009.01)

(52) U.S. Cl.
CPC .......... *H04W 40/24* (2013.01); *H04W 48/18* (2013.01); *H04W 84/00* (2013.01)

(58) Field of Classification Search
CPC ... H04W 84/00; H04W 84/005; H04W 84/02; H04L 41/12; H04L 12/2416; H04L 29/08315; H04L 45/02; H04L 41/147; H04L 67/1042; H04L 47/823
See application file for complete search history.

(56) References Cited

U.S. PATENT DOCUMENTS

| | | | |
|---|---|---|---|
| 8,249,605 | B2 | 8/2012 | Niranjan et al. |
| 2002/0142788 | A1* | 10/2002 | Chawla ................ H04W 16/18 455/504 |
| 2007/0253341 | A1 | 11/2007 | Atkinson et al. |
| 2009/0047948 | A1 | 2/2009 | Turetsky et al. |
| 2011/0128890 | A1* | 6/2011 | Schein .................... H04L 41/12 370/255 |
| 2011/0207509 | A1 | 8/2011 | Crawford |
| 2011/0320607 | A1* | 12/2011 | Harrang ................ H04W 4/028 709/226 |
| 2012/0052817 | A1 | 3/2012 | Lee et al. |
| 2012/0198092 | A1* | 8/2012 | Sheridan ............. H04L 12/6418 709/241 |
| 2012/0258872 | A1* | 10/2012 | Delacourte ........ A61K 39/0007 506/6 |
| 2012/0278464 | A1 | 11/2012 | Lehane et al. |
| 2013/0042003 | A1* | 2/2013 | Franco ................ H04L 67/1097 709/226 |
| 2013/0159478 | A1* | 6/2013 | Rousu ............... H04W 52/0229 709/221 |
| 2013/0166712 | A1* | 6/2013 | Chandramouli ........ G06F 9/505 709/223 |
| 2013/0322329 | A1* | 12/2013 | Visuri .................. H04W 48/16 370/328 |

OTHER PUBLICATIONS

Bengy Ahlgren et al., "Content, Connectivity, and Cloud: Ingredients for the Network of the Future," IEEE Communications Magazine, Jul. 2011, pp. 1-9, IEEE.

Curt Schurgers and Mani B. Srivastava, "Energy Efficient Routing in Wireless Sensor Networks," 2001, pp. 357-361, IEEE.

International Search Report and Written Opinion, International Application No. PCT/US2013/032530, Date: Oct. 31, 2013, pp. 1-9.

Kyu-Han Kim et al., "On Cloud-Centric Network Architecture for Multi-Dimensional Mobility," MCC'12, Aug. 17, 2012, Helsinki, Finland, pp. 1-6, ACM.

Office Action, EP Application No. 13878171.1, dated Jul. 11, 2017, pp. 1-6, EPO.

* cited by examiner

CLOUD-BASED CONNECTIVITY

BACKGROUND

Wireless communication technologies have seen dramatic improvements over the past years. Increasing number of today's mobile users carry multiple mobile devices, each of the devices being equipped with a diverse set of communication or radio interfaces. Through these interfaces, the mobile devices can establish communications with each other, reach the Internet, or access various data services through wireless networks. Various devices such as Internet-enabled tablets, smart phones, laptops, televisions, and gaming consoles have become essential personal accessories, connecting users to friends, work, and entertainment. Users now have more choices and expect to have the best possible access to all devices, data, and content at all times. The increased number of users that utilize wireless communication services stimulates service providers to offer improved communications options that can meet the increase in user demand, support the array of new services, and provide fast and reliable communication.

DETAILED DESCRIPTION

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. It should also be noted that a plurality of hardware and software based devices, as well as a plurality of different structural components may be used to implement the disclosed methods and systems.

As used herein, the terms "mobile device" and "wireless device" may be used interchangeably and refer to any one of various smart-phones (e.g., Samsung Galaxy®), cellular telephones, tablets, (e.g., iPAD®), laptop computers, personal data assistants (PDA's), VoIP phones, wireless enabled televisions, wireless enabled entertainment systems, and other similar electronic devices that include a processor and are capable of sending and receiving wireless or wired communication signals.

As used herein, the term "communication interface" refers to various protocols available to any of the wireless devices to communicate with each other and with a network. In particular, the communications interface may include Wi-Fi, Bluetooth, 3G, 4G, and any other comparable communications interfaces.

Users can own and carry a variety of wireless devices at any given time. For example, many users carry and may use a smart-phone, a tablet, and a laptop computer at the same time. Each of these wireless devices has at least one communication interface that is used to connect with other wireless devices, to the Internet, or to any other network. In one example, a user may have a smart-phone and a tablet, where both devices have Wi-Fi, Bluetooth, and 3G capabilities. Because of this diversity (i.e., each user has many wireless devices with different communication interfaces), the possible ways in which these wireless devices can establish connections in a network topology has increased exponentially.

In communications networks that include several wireless devices, a network topology represents a schematic description of the arrangement of a network, including its nodes (e.g., representing the wireless devices) and edges or connecting lines (i.e., representing the communication links). There are two main network topologies: a physical topology and a logical topology. The physical topology of a network is the actual geometric layout of the nodes (e.g., point to point, bus, star, ring, etc.), while the logical topology refers to the way that the data passes through the network from one device to the next without regard to the physical interconnection of the devices.

It is generally inconvenient and challenging for a user to manually establish network connections between the various wireless devices he or she owns. The combination of several wireless devices owned or carried by a user can offer a number of possible different network topologies. Each different topology offers both benefits and disadvantages that can affect important attributes of each mobile device such as power consumption, data plan utilization, bandwidth usage, content consumption latency, and others. The benefits or the disadvantages of each possible network topology are often not obvious to a user and making an informed decision requires knowledge of the specific characteristics of each type of device and its communication interfaces.

This description is directed to cloud-based connectivity control systems and methods that analyze a group of wireless devices with different communication interfaces owned or operated by the same user to determine an optimal network topology for that group of devices. In one example, the proposed control system receives context information from each of the wireless devices that belong to the same user. The context information may include location of the wireless devices at a specific time, battery level, battery charge time, power charge and discharge rate, bandwidth consumption, content consumption latency, data consumption of the device, available access points, and other similar information. The system stores the context information in a memory. Further, the proposed system predicts future consumption patterns for each of the devices by using the received and stored context information. The system then creates a connectivity representation for the plurality of wireless devices with the received context information, the future consumption patterns, and information about available network connections. Finally, the system determines the optimal network topology for the group of wireless devices at any given time and location. The system may also send control signals to the user's wireless devices in order to implement the optimal topology.

The goal of the proposed system is to utilize a cloud-based controller to allow a user that operates a group of wireless devices to achieve the best possible connectivity through an optimal allocation of the devices' communication interfaces. The created optimal network topology provides battery conservation of the devices, improves the management of their data plans, and improves bandwidth provisioning for each device. Using the control system to determine the optimal network topology of a group of wireless devices provides a resilient and an efficient connectivity solution for each user. This also eliminates the need for the user or each mobile device to decide how to efficiently connect to a network.

Figure 1:
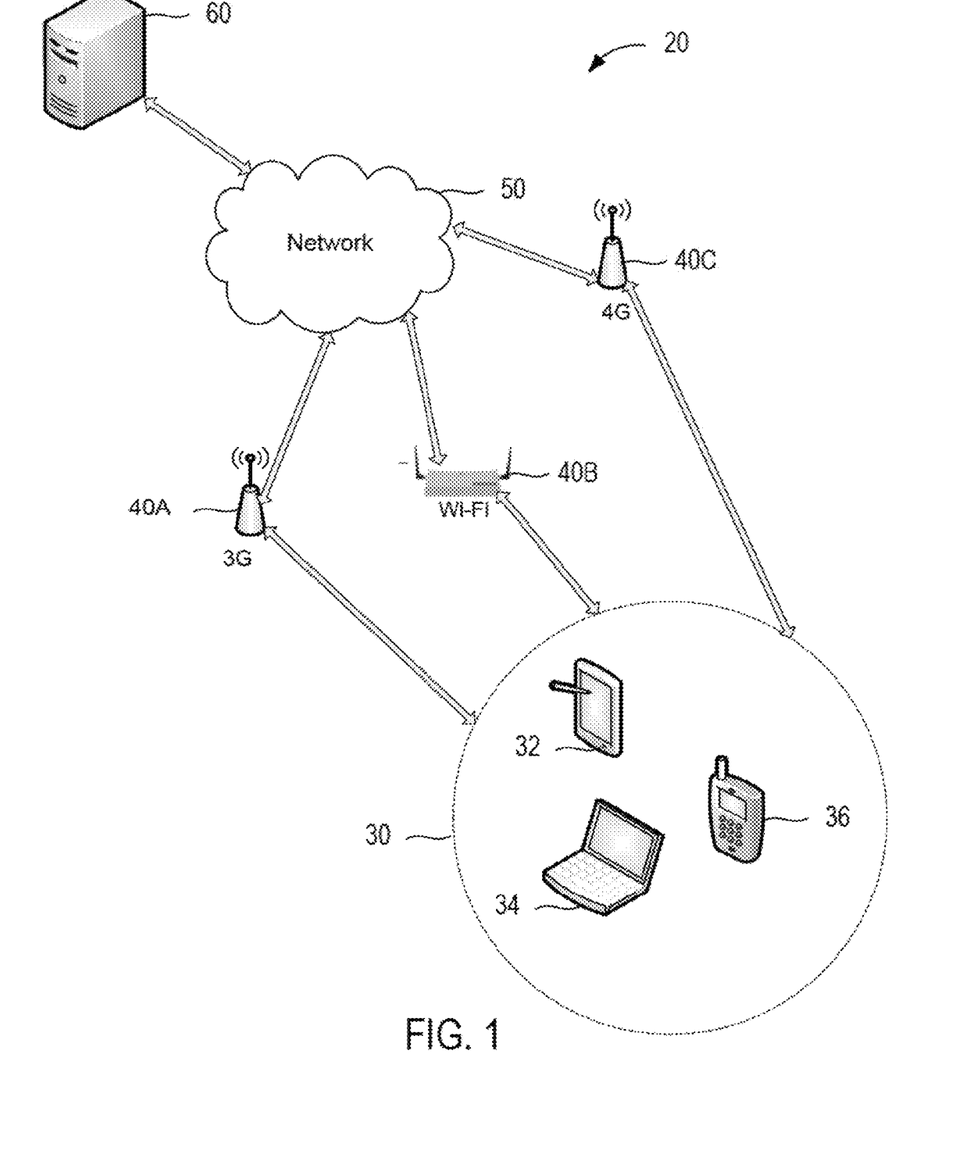
FIG. 1 is a schematic diagram illustrating an example of a cloud-based connectivity system.

FIG. 1 is a schematic illustration of an example of a cloud-based connectivity control system 20. The system 20 includes a plurality of wireless devices 30, a plurality of wireless access points 40A-C connected to the wireless devices 30 and to a network 50, and a computing device 60. The computing device 60 is in communication with the wireless devices 30 via the network 50 and the access points 40A-C.

The wireless devices 30 belong to or are operated by the same user (not shown) to allow the user to communicate with other users and/or transfer various information via the devices 30. In the illustrated example, the wireless devices 30 include a tablet 32, a laptop computer 34, and a smartphone 36. In alternative examples, the user can own or operate different wireless devices (e.g., cellular telephone, PDA, wireless television, wireless entertainment systems, and other similar wireless devices). Each of the wireless devices 30 includes communication interfaces that are used to connect with the other wireless devices or to the network 50. The communication interfaces of the wireless devices 30 may include a Wi-Fi interface, a Bluetooth interface, a 3G interface, a 4G interface, a near filed communication (NFC) interface, and any other suitable interface.

The wireless access points 40A-C may include any type of access point that allows a communication between the wireless devices 30 and the network 50. In the illustrated example, the wireless access points of the system 20 include a 3G tower 40A, a Wi-Fi access point 40B, and a 4G tower 40C. In alternative examples, the system 20 can include other suitable access points. Each access point 30 has an associated coverage area (not shown). It is to be understood that the various access points may have different power levels, and consequently may have different coverage areas.

The network 50 is configured to connect the computing device 60 and the wireless devices 30 so the computing device 60 can transmit control signals to the wireless devices 30 via the cloud. The network 50 may include any suitable type or configuration of network to allow the computing device 60 to communicate with the wireless devices 30 or other wireless devices (not shown). For example, the network 50 may include wide area network ("WAN") (e.g., a TCP/IP based network, a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a Digital Enhanced Cordless Telecommunications ("DECT") network, a Digital AMPS ("IS-136/TDMA") network, or an Integrated Digital Enhanced Network ("iDEN") network, etc.). The network 50 can further include a local area network ("LAN"), a neighborhood area network ("NAN"), a home area network ("HAN"), a personal area network ("PAN"), a public switched telephone network ("PSTN"), an Intranet, the Internet, or any other suitable network.

The computing device 60 provides control signals that control the operation of the wireless devices 30. That way, the computing device 60 can control the connectivity of the various wireless devices 30 via the cloud (i.e., the network 50). In one example, the computing device 60 analyzes information related to the group of mobile devices 30 that have different communication interfaces. As described in additional detail below, the computing device 60 implements various methods to determine an optimal network topology for the group of devices owned or operated by the same user. Further, the computing device 60 may send control signals to the wireless devices 30 to implement the determined optimal topology.

Figure 2:
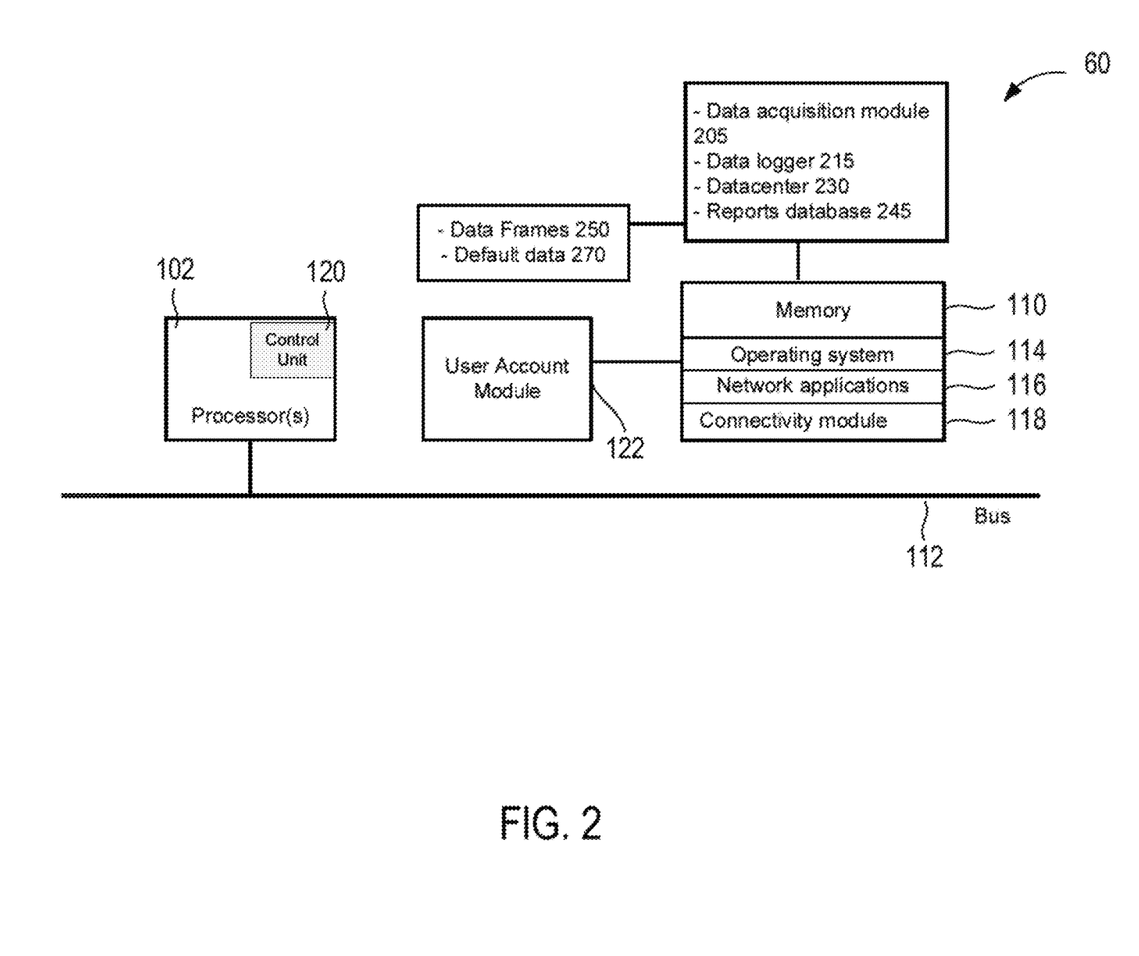
FIG. 2 is a schematic diagram illustrating an example of a computing device of the cloud-based connectivity system of FIG. 1.

FIG. 2 is a schematic diagram illustrating an example of the computing device 60 of the system 20. The computing device 60 can be a server, a desktop computer, a laptop, or any other suitable device configured to carry out communication with the wireless devices 30 via the network 50. The device 60 may include a processor 102 (e.g., a central processing unit, a microprocessor, a microcontroller, or another suitable programmable device); and a memory 110. Each of these components is operatively coupled to a bus 112. For example, the bus 112 can be an EISA, a PCI, a USB, a FireWire, a NuBus, or a PDS. The computing device 60 includes additional, fewer, or different components for carrying out similar functionality described herein.

The processor 102 includes a control unit 120 that may be implemented using any suitable type of processing system (not shown) with a processor configured to execute computer-readable instructions stored in the memory 110. The memory 110 includes any suitable type, number, and configuration of volatile or non-transitory machine-readable storage media to store instructions and data. Examples of machine-readable storage media in the memory 110 include read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, hard disk, an SD card, and other suitable magnetic, optical, physical, or electronic memory devices, among others.

The computer memory 110 may also store an operating system 114, such as Mac OS, MS Windows, Unix, or Linux; network applications 116; a connectivity module 118; and a user account module 122. The operating system 114 can be multi-user, multiprocessing, multitasking, multithreading, and real-time. The operating system 114 can also perform basic tasks such as recognizing input from input devices, such as a keyboard, a keypad, or a mouse; sending output to the wireless devices; keeping track of files and directories on medium 110; controlling peripheral devices, such as disk drives, printers, image capture device; and managing traffic on the bus 112. The network applications 116 include various components for establishing and maintaining network connections, such as computer-readable instructions for implementing communication protocols including TCP/IP, HTTP, Ethernet, USB, FireWire, etc.

The connectivity module 118 provides various computer-readable instruction components for determining a plurality of network connectivity options for the wireless devices 30 and selecting an optimal network topology. As described in additional detail below, in one example, the connectivity module 118 uses context information from the wireless devices 30, future consumption patterns for the devices 30, and information about available network connections to determine a plurality of network connectivity options. The connectivity module 118 selects an optimal network topology for the plurality of wireless 30 devices from the determined plurality of network connectivity options.

The user account module 122 provides instructions that allow a user to register a plurality of wireless devices 30 with the system 20. That way, the system 20 recognizes the devises 30 that belong to the same user and can determine the optimal network topology for these devices at any given time. During his or her first use of the system 20, a user creates a user account (i.e., a profile) by providing personal information to the system 20 via a user interface (not shown). A user may enter the information via the user interface of one of the wireless devices 30 or a user interface connected to the computing device 60. After creating an account, the user registers the plurality of wireless devices associated with that user by providing information about each device (e.g., device type, model number, etc.). At any time, the user can update his or her account by adding or removing devices 30.

The machine-readable storage media are considered to be an article of manufacture or part of an article of manufacture. An article of manufacture refers to a manufactured component. Software stored on the machine-readable storage media and executed by the processor 102 includes, for example, firmware, applications, program data, filters, rules, program modules, and other executable instructions. The control unit 120 is configured to retrieve from the machine-readable storage media and execute, among other things, instructions related to the control processes and methods described herein.

Information and data associated with the system 20 and the wireless devices 30 can be stored, logged, processed, and analyzed to implement the control methods and processes described herein. For example, the memory 110 includes a data acquisition module ("DAQ") 205, a data logger or recorder 215, a datacenter 230, and a reports database 245. The DAQ module 205 is configured to receive context information from the wireless devices 30. In one example, the DAQ module 205 acquires the following context information for each device 30: location of the wireless device at a specific time, current battery level, battery charge time, average power charge and discharge rate, average bandwidth consumption, average content consumption latency, average data consumption of the device, available access points, and other similar information related to the operation of each device 30.

The DAQ module 205 receives context information from the wireless devices 30 at predetermined time periods. In some examples, context information from the wireless devices 30 is obtained every week (e.g., Monday-Sunday), where the week may be subdivided into smaller time periods (e.g., 6 hours, 2, hours, 1 hour, 30 minutes, 15, minutes, 10 minutes, 5 minutes, etc.). In other examples, the time periods for obtaining context information can be based on hour, time of day, day, week, month, etc., or a combination of the above. During each time period, the DAQ receives information about the location of the wireless devices 30 along with the other context information described above (e.g., via the network 50). Alternatively, the DAQ module 205 can also receive other type of information from the wireless devices 30 or any other devices or system (not shown) that are in communication with the computing device 60.

The DAQ module can acquire context information from the wireless devices 30 for a plurality of different time periods. The information gathered by the DAQ module 205 is provided to the data logger or recorder 215. The data logger or recorder 215 is configured to store the information in the datacenter 230 for further storage and processing. In one example, the datacenter 230 is included in the memory 110 of the computing device 60. In another example, the datacenter 230 is a remote datacenter (i.e., not located in the computer 60). In that example, the data logger or recorder 215 provides the information through a network (e.g., the network 50) to the datacenter 230.

The datacenter 230 stores the information received from the data logger or recorder 215. Then, the processor 102 of the computing device 60 generates a plurality of data frames 250 based on the processed information from the data logger 215. In one example, each data frame 250 includes context information related to the devices 30 for one predetermined time period. As described in additional detail below, the processor 102 analyses the data frames 250 to predict future consumption patterns for the devices 30. The data frames 250 can be compiled and outputted to the reports database 245 for storage.

When a user registers a device for a first time or adds a new device to an existing account, the datacenter 230 or the reports database 245 do not include any current context information (i.e., data frames 250) for the new device. In that situation, when the user enters the new device into the system 20, the user selects a device class and model from a predetermined list of classes and devices stored in the memory 110. The list may include different types of devices (e.g., smart-phone, laptop, etc.) and a specific make and model (e.g., Samsung Galaxy S3®) of the device within each class. The selected device class and model is associated with default data 270 related to the specific new wireless device 30. This default data 270 may be stored in the datacenter 230 and is automatically retrieved from the control unit 120 when a user selects a device 30.

The default data 270 includes predetermined context information for a device or class of devices. For example, the default data may include a power profile for each new device. All devices consume energy at a different rate. Some devices have screens that consume more power than others, and some devices have better battery life than others. In one example, the energy profile for a new device can be determined via crowdsourcing. If no profile is available for the new device, an available profile that more closely matches the device specifications may be used by the computing device 60.

When a new device 30 is registered with the system 20, the control unit 120 initially uses the default data 270 to perform the methods described below and to determine the optimal topology of the user's devices. After the initial registration, the computing device 60 starts collecting context information from the new device 30 in the manner described above. Thus, any new device goes through a "warm up" period during which the computing device 60 uses the default data 270 while acquiring current context information for the new device 30.

Therefore, the information and data stored in the data frames 250 and the information in the default data 270 can be accessed by the computing device 60 for processing and analysis. For example, the computing device 60 is configured to process and analyze the stored information to determine future consumption patterns for each of the plurality of wireless devices 30 and to determine an optimal network topology for the user's devices 30.

Figure 3:
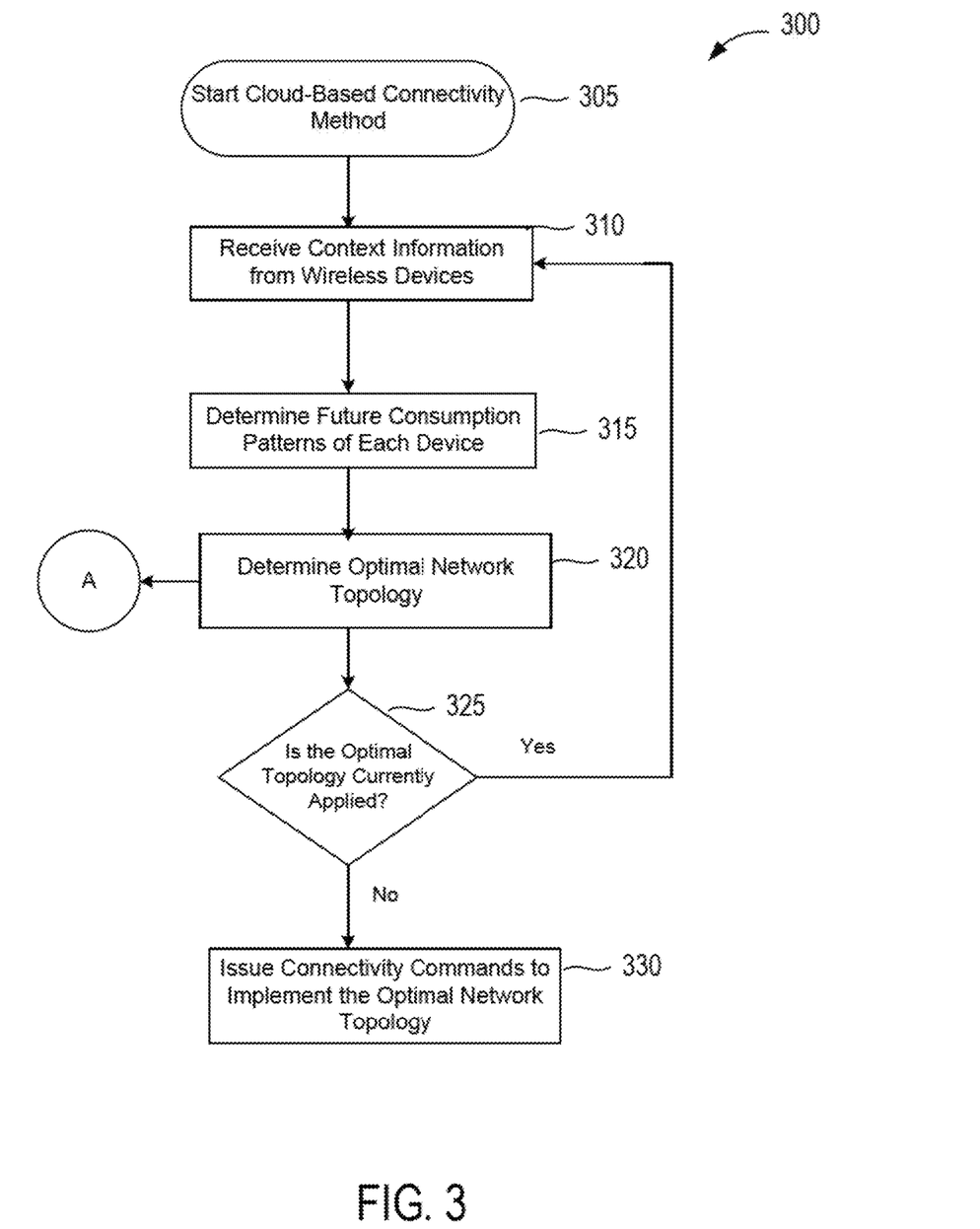
FIG. 3 is a flow chart illustrating an example of a cloud-based connectivity method.

FIG. 3 illustrates a flow chart showing an example of a cloud-based connectivity method 300. The method 300 can be executed by the control unit 120 of the processor 102. Various steps described herein with respect to the method 300 are capable of being executed simultaneously, in parallel, or in an order that differs from the illustrated serial manner of execution. The method 300 is also capable of being executed using additional or fewer steps than are shown in the illustrated example.

The method 300 begins in step 305. In step 310, the control unit 120 receives context information from the wireless devices 30. One example for receiving context information from the devices 30 and generating the data frames 250 from the received information was described in the preceding paragraphs in relation to the operation of the computing device 60.

Next, at step 315, the control unit 120 determines future consumption patterns for each of the devices 30 that belong to the same user. In one example, the control unit 120 uses the generated data frames 250 and/or the default data 270 to determine the future consumption patterns of the devices 30. As noted above, the data frames 250 may include information about: location of the wireless device at a specific time, current battery level, battery charge time, power charge and discharge rate, bandwidth consumption, content consumption latency, and data consumption of the device for a specific time period (e.g., 2 hours, 12 hours, etc.). By using information from the data frames 250 (or from the default data 270 when the device is new), the control unit 120 generates the future consumption patterns that may include predictions about the remaining battery level, the remaining data capacity, bandwidth capacity, and content consumption latency of each device 30 at the end of each predetermined time period. In addition, by using information about the battery charge time and the location of the device, the control unit may also determine the next time when a charging source is available.

As noted above, the data frames 250 may include information related to specific energy, data, and service characteristics of the devices 30 for a specific time period. The processor 102 analyses the context information received from the devices 30 and identifies the necessary data to determine future consumption patterns that make predictions related to the future use of the devices. For example, if a user charges a device at nine pm on a Monday, at a location X, three weeks in a row, location X is identified as a location with high likelihood as having a charging source. Also, the time nine pm on a Monday is identified as a time when the device is likely to be charged by a specific amount (e.g., 75% of the battery). Similarly, if a user watches video on a Thursday at eight am for two consecutive weeks, the location (e.g., the commuter train) is flagged with high likelihood to drain battery resources, and also with high likelihood of energy consumption.

The processor 102 is also configured to use the data in the data frames 250 to calculate and predict approximate energy consumption of the devices. For example, the data frames 250 can provide information that during one month a user utilizes 150 joules ("J") of energy three out of four Tuesdays at nine pm and the fourth Tuesday he or she uses only 50 J. Therefore, the processor 102 can predict that for this time period, a user consumes an average of 125 J based on the four readings. Using the data frames 250, the processor can perform similar analysis for bandwidth consumption, content consumption latency, and data consumption of the devices based on the information in the data frames.

The control unit 120 can apply various probabilistic techniques to generate the future consumption patterns for each device 30. In one example, the control unit 120 may subtract the values between the data frames 250 following the current time of the day. In another example, the control unit 120 may use Markov model calculations to generate the future consumption patterns. Alternatively, the control unit 120 may also use any other temporal differentiation learning method.

In step 320, the control unit 120 determines an optimal network topology using the consumption patterns, the received context information (i.e., data frames 250), and information about the available network connections of the devices 30. As explained in additional details below, in one example, the control unit 120 determines a plurality of network connectivity options (i.e., topologies) for the wireless devices 30. In particular, the control unit 120 is configured to create a connectivity representation that includes the devices 30 and the available connectivity options between the devices 30. The control unit 120 then evaluates all available topologies based on specific requirements (e.g., data consumption, power, bandwidth, connectivity, etc.) to determine the optimal network topology.

An optimal network topology for the devices 30 eliminates data overage charges and balances the energy consumed during network communications between all the devices 30, by attempting to keep all the devices 30 available until there is an opportunity to recharge them. Further, this optimal topology relives a user from the burden of choosing a connection topology that satisfies the previous two requirements while providing the appropriate quality of service (e.g. large bandwidth and low latency).

Next, in step 325, the control unit determines whether the optimal topology is currently applied to the devices 30 in the system 20. If the optimal topology is currently applied to the devices 30, the method 300 returns to step 310, where the control unit 120 continues to receive context information from the wireless devices 30 and steps 310-325 are performed again. If, however, the optimal topology is not currently applied to the devices 30, the control unit 120 issues connectivity commands to each wireless device 30 based on the determined network optimal topology to implement that desired topology.

Figure 4:
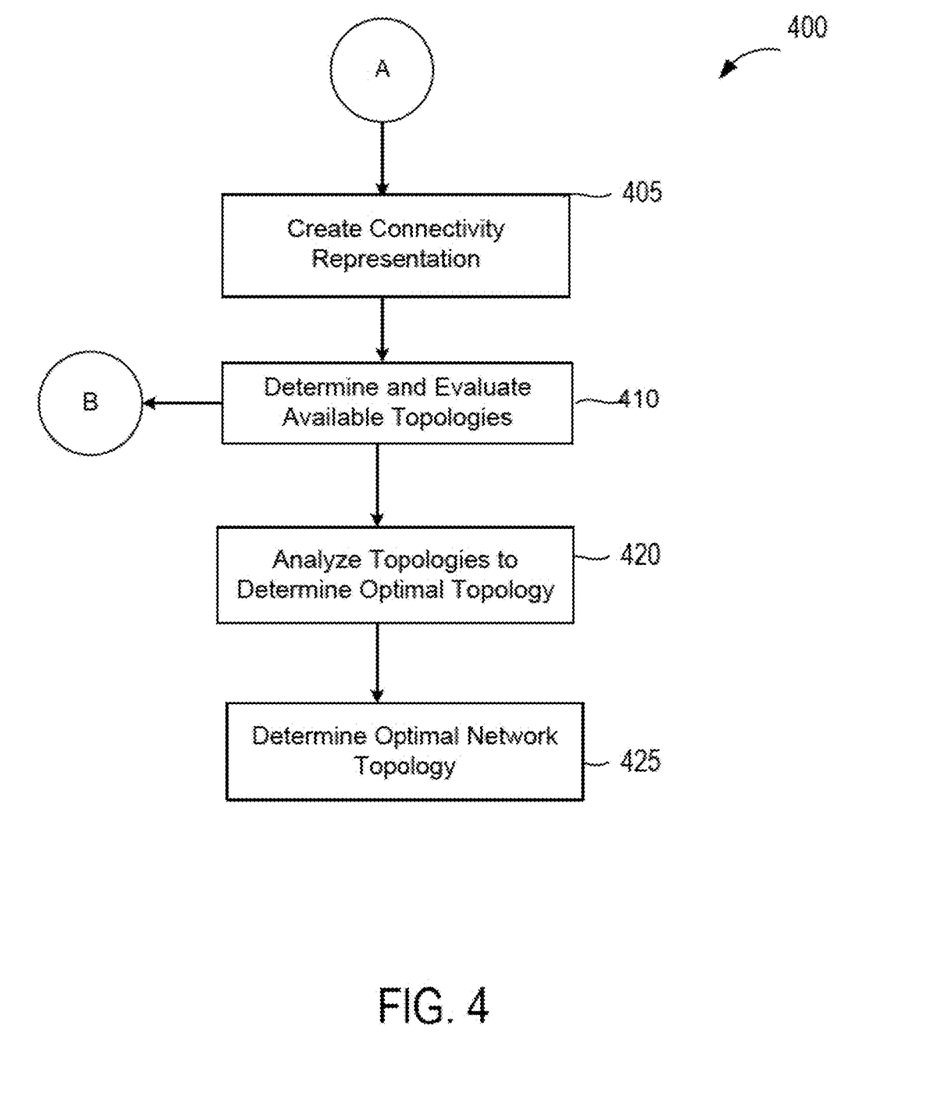
FIG. 4 is a flow chart showing an example of a method for determining an optimal network topology.

FIG. 4 illustrates a flow chart showing an example of a method 400 for determining an optimal network topology. The method 400 can be executed by the control unit 120 of the processor 102. Various steps described herein with respect to the method 400 are capable of being executed simultaneously, in parallel, or in an order that differs from the illustrated serial manner of execution. The method 400 is also capable of being executed using additional or fewer steps than are shown in the illustrated example.

Figure 5:
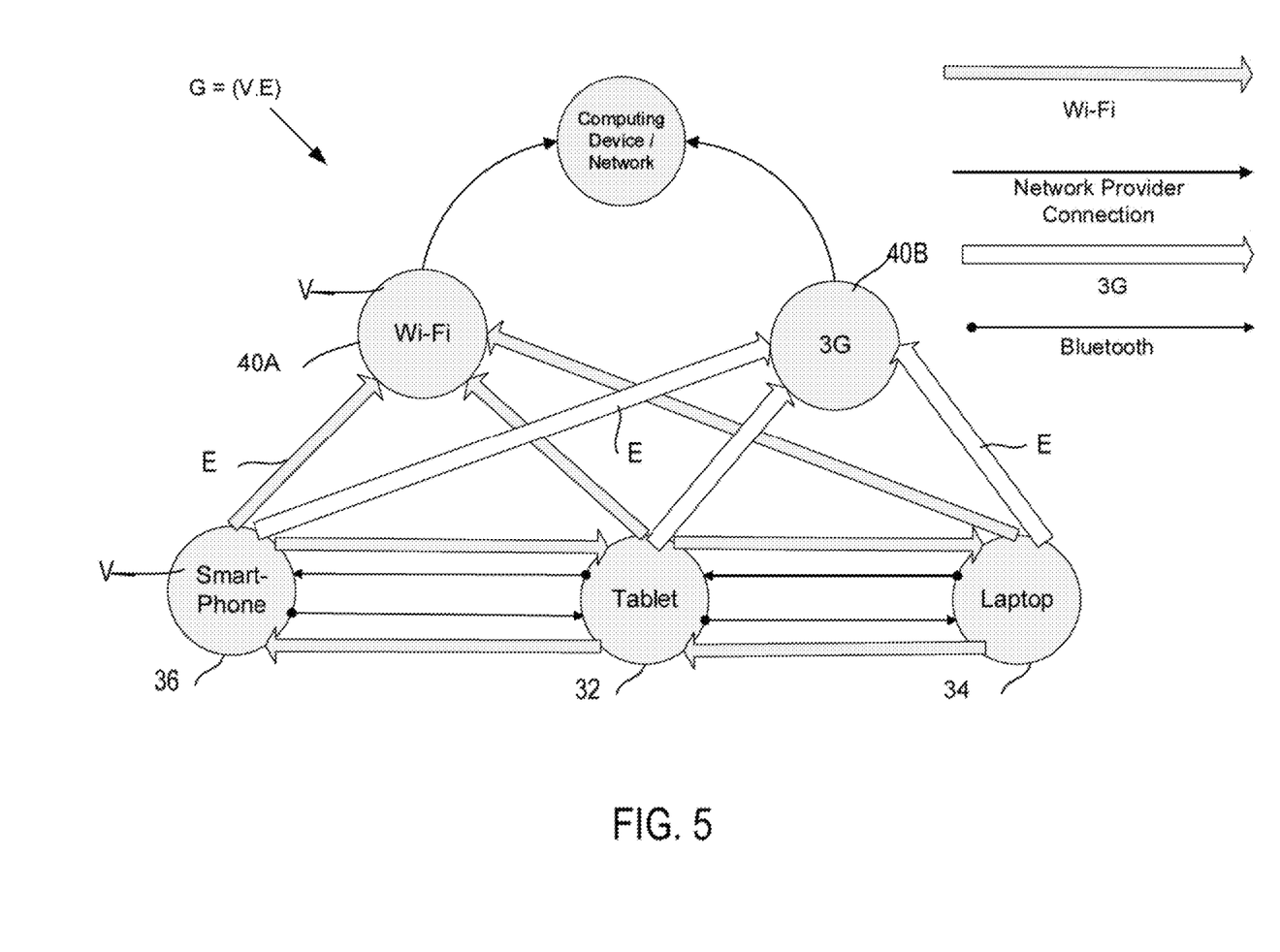
FIG. 5 illustrates an example of a connectivity graph.

The method 400 begins in step 405, where the control unit 120 creates a connectivity representation for the devices 30. An example of the connectivity representation in the form of a graph G=(V,E) is shown in FIG. 5. The method 400 will be described by using the example graph G. However, it is to be understood that the connectivity representation can include a table, a diagram, a chart, or any other type of representation that represents the devices 30 that are owned or operated by the same user and the available connectivity options between the devices 30. In FIG. 5, the graph G represents the user's devices 30 and their means to connect to each other and to a network (e.g., the network 50). The graph G includes a plurality of vertices V and edges E. Each vertex represents a wireless device 30 that belongs to the specific user and has at least one communication interface (e.g., Wi-Fi, Bluetooth, 3G, 4G, etc.).

In the example shown in FIG. 5, the devices in the graph G include the user's wireless devices 30 (i.e., the tablet 32, the laptop 34, and the smart-phone 36), the access points 40A and 40B, and the computing device 60 in the cloud (i.e., the network 50). Each edge E=(u,v) represents a potential network connection between a source u (e.g., a smart phone 36) and a provider v (e.g., 3G access point). The direction of each edge E always flows from the source u towards the computing device 60, and in consequence, the network 50. Specifically, each edge E flows from a source u towards an access point or another device that may act as an access point to allow the source to connect to the network 50 and the computing device 60.

Each mobile device vertex includes information about the resources of the device 30: the remaining energy, the remaining capacity of the data plan, the required bandwidth and latency of running applications, and potentially any other data associated with the resources of the device. In one example, that information may be retrieved from the data frames 250. Alternatively, that information can be directly sent from a device 30 to the computing device 60. Each edge E is annotated with the consumption requirements for each mobile device 30 involved in the connection. These requirements may include the following: the energy consumed, the amount of mobile data used, the content consumption latency incurred in the transfer, and the bandwidth provided by the edge. In addition, each edge E includes a connection attribute that has a value of 1 for an active network connection edge and a value of 0 for a disabled network connection edge. Finally, the edge also includes the generated consumption patterns to be achieved at the end of the time period for each device v. For example, the edge includes a prediction of the remaining energy in a vertex v and a predication of the remaining capacity of the data plan in the vertex v.

Therefore, the control unit 120 uses information from the data frames 250 (or from the default data 270 when the device is new to the system), the generated future consumption patterns, and information about available network connections of the devices to create the connectivity graph G. The connectivity graph identifies all the possible ways in which the devices 30 owned or operated by the same user can be connected.

The network connections shown in FIG. 5 include: Wi-Fi connection, 3G connection, Bluetooth connection, and a network connection to the computing device 60. In the illustrated connectivity graph of FIG. 5, all of the devices 30 have access to the network 50 and the computing device 60 via a 3G connection, a Wi-Fi connection, or a Bluetooth communication interface that can be used for direct peer-to-peer communication between the devices 30.

In other examples, not all devices 30 may have direct connection to the network 50. For example, a device with a Wi-Fi communication interface but without a 3G communication interface cannot reach the network 50 if there is no Wi-Fi access point accessible to that device. In that situation, the control unit 120 of the system 20 implements a bootstrap policy including an automatic tethering operation to enable such devices to reach the network 50 and the computing device 60 through one of the other devices that can access it. By using this bootstrap policy, all devices 30 can reach the network 50 without initially receiving communication signals from the computing device 60. The bootstrap policy guarantees connectivity for all devices 30 in the system 20 as long as at least one of the devices 30 can reach the network 50 through its own communication interfaces and has available resources to allow the other devices 30 to connect to the computing device 60 through it.

When a device 30 joins the system 20 (i.e., when is registered by a user), that device is registered in the cloud with the computing device 60. The computing device 60 coordinates all the devices 30 owned by the same user and included in the user's account. At the moment of registration, the computing device 60 sends to the new device 30 the necessary credentials to access the connectivity services provided by the other devices 30 within the user's account. These credentials may include, for example, a service set identification ("SSID") and password used by the access points connected to the other devices 30. Through these credentials, any device 30 within the user's account can tether via the other devices 30 without requiring an explicit command of the computing device 60.

In one example, when a device 30 starts, the control unit 120 automatically sends instructions to the device to attempt to connect to the computing device 60 through any known or open Wi-Fi access point (including tethering through other devices within the user's account). If the device 30 is not able to reach the computing device 60 through the available Wi-Fi resources, it attempts to connect using its 3G communication interface. Finally, if the 3G communication interface is also unavailable, the device 30 attempts to reach the computing device 60 via another device 30 sharing a network (e.g., the Internet) through Bluetooth. If additional network interfaces are available (e.g., Ethernet, etc.), the device 30 may also attempt to connect via these network interfaces.

If none of these connections are available, the device 30 remains disconnected and periodically attempts to connect again. This situation only occurs when no device in the user's account are able to connect to the network. As long as there is at least one other device 30 with connectivity to the network and additional network connections to share, there is at least one device 60 ready to provide internet connectivity to all device in the system 20.

Next, in step 410, the control unit 120 determines and evaluates the available topologies (or the different network connectivity options) for the wireless devices 30 based on the generated connectivity graph G. One specific method for determining and evaluating the available topologies is described in FIG. 6. As described in additional detail below, in one example, the method of FIG. 6 eliminates topologies that do not meet specific requirement and stores the remaining topologies in a table in the memory 110. In step 420, the control unit 120 analyzes the remaining topologies in order to determine the optimal network topology. In one example, the control unit 12 sorts the topologies from the created database by their bandwidth and latency characteristics. The control unit searches for the topology with the best possible service parameters. The service requirement relate to topologies that provide largest bandwidth and the lowest content consumption latency. After the topologies are sorted, in step 425, the control unit 120 determines which topology provides the largest bandwidth and the lowest latency for the devices 30 and selects it as the optimal network topology. In addition, the control unit 120 may also analyze the "cost" of selecting a topology (i.e., predicted consumption resulted from selecting a topology, described in more detail below) to decide what is the optimal topology.

Figure 6:
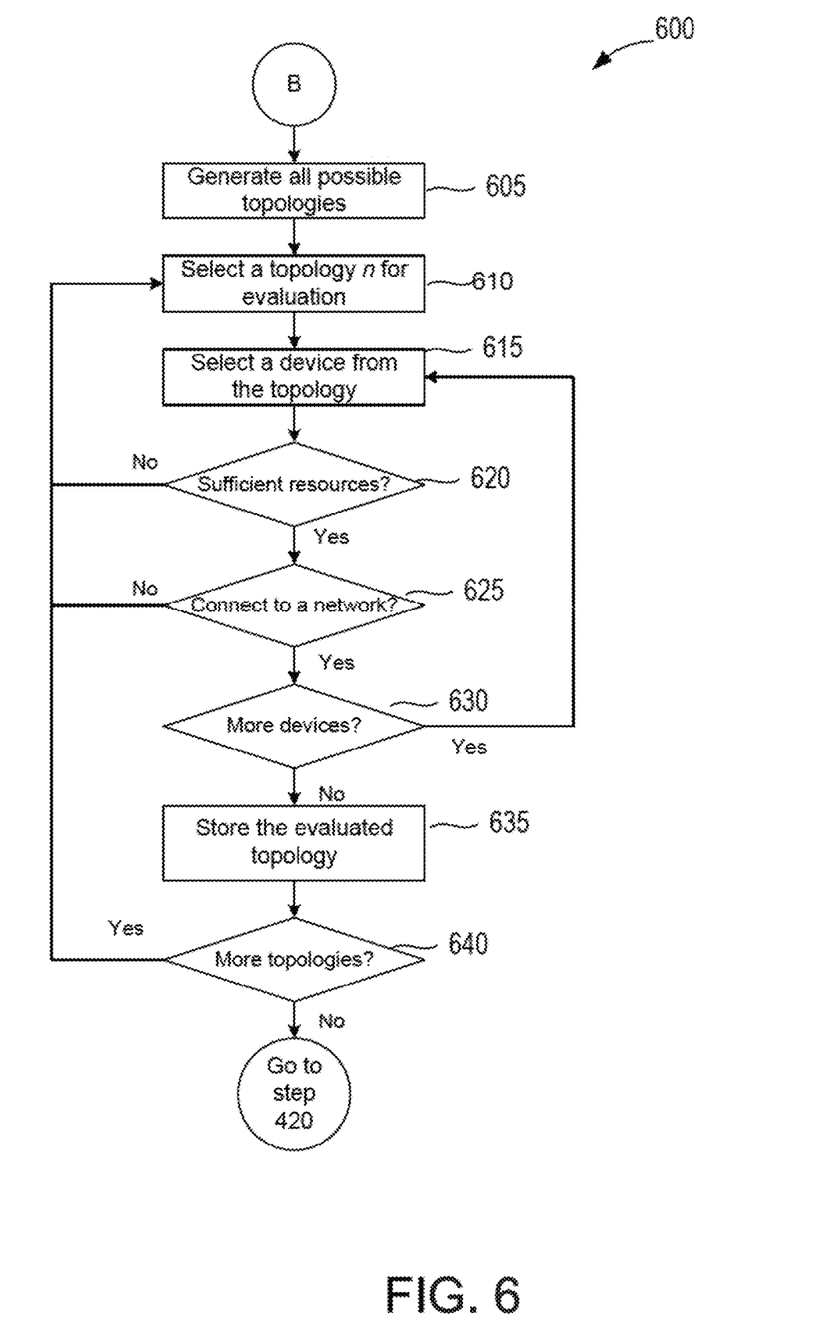
FIG. 6 illustrates a flow chart showing an example of a method for determining and evaluating available topologies.

FIG. 6 illustrates a flow chart showing an example of a method 600 for determining and evaluating available topologies for the wireless devices 30. The method 600 can be executed by the control unit 120 of the processor 102.

Various steps described herein with respect to the method 600 are capable of being executed simultaneously, in parallel, or in an order that differs from the illustrated serial manner of execution. The method 600 is also capable of being executed using additional or fewer steps than are shown in the illustrated example.

The method 600 begins in step 605, where the control unit 120 determines all possible topologies or network connectivity options for the user's devices 30 based on the connectivity representation or graph G. Next, at step 610, the control unit 120 selects a topology n from the generated topologies for evaluation. In one example, each topology is evaluated by exploring the connectivity graph G in a depth first order. Evaluation of the topology is performed once for each of the devices or vertices 30, using each device as a source. In other examples, other algorithms for exploring the connectivity graph G and generating available topologies can be used.

In step 615, the control unit 120 selects a device from the selected topology n to begin the evaluation of the topology. The control unit 120 evaluates the resources of the selected device (e.g., the remaining energy, the remaining capacity of the data plan, the required bandwidth and latency of running applications, etc.) to determine whether these resources are sufficient to satisfy the requirements of the device based on the expected consumption patterns (at step 620). When evaluating each device, the control unit 120 considers the resources used by the device that is already connected to the network. If the resources of the device 30 are insufficient, the control unit 120 disregards that topology and selects the next topology for evaluation. If the resources of the device are sufficient, the control unit 120 determines whether the selected device can reach the network 50 based on the information from the connectivity graph (at step 625). If the device is not able to reach the network, the control unit 120 disregards that topology and selects a new topology. If the device connects to a network, the control unit 120 proceeds with evaluating the topology by determining if there is another device (at step 630).

By evaluating the resources for each device in a topology, the control unit 120 eliminates topologies that do not meet energy and data service requirements. In one example, the energy requirements relate to balancing the energy consumed by all the devices 30 in the evaluated topology to attempt to keep all devices available for the longest possible time. The data requirements relate to eliminating data coverage for all devices in the evaluated topology.

Steps 620-630 are repeated for all devices 30 in the selected topology. If the evaluated topology meets the resource requirements, it is annotated with a "costs" of choosing that topology. The control unit 120 determines the cost for choosing a topology by performing a computational analysis related to the future use of the topology. In one example, the control unit assumes that the topologies with the highest probabilities of being used are the ones that will indeed be applied. The control unit 120 analyzes the context from the data frames 250 and the future consumption patterns to determine the next time a device is charged (i.e., for energy) and the next time a data plan is refreshed (i.e., for mobile data).

For example, if topology X is chosen, topology X has a cost of Xi joules for the time period i. Based on the information from the data frames 250 and the future consumption patterns, the control unit 120 determines that the context requirements (e.g., mobile devices, available access points, etc.) will not change enough to cause a topology change for the next ten time periods. The control unit 120 evaluates the system by looking at a number of time periods (e.g., 10 time periods) ahead and assuming topology X is held. The control unit 120 computes the cost for the next ten time periods Xi, Xj, Xk . . . etc. Once this computation is completed, the control unit 120 annotates the topology with the predicted consumption resulted from selecting it (i.e., the cost) and that is later used to decide what is the best topology.

After all devices in a topology are evaluated, at step 635 the control unit stores the topology in a database (e.g., in the memory 110). The control unit then determines whether there are more topologies that need to be evaluated (at step 640). If there are more topologies available for evaluation, the control unit evaluates these topologies as described above. If there are no more topologies, the control panel 120 moves to step 420 of the method 400 and determines the optimal network topology for the devices as described above.

The above examples of cloud-based connectivity system 20 advantageously allows for automatically determining of optimal network topology for a plurality of devices. Further, the described system prevents a user form exceeding an allocated data plan, keeps all devices powered for the longest possible time, and provides the best possible bandwidth and the lowest content consumption latency for all devices.

What is claimed is:

1. A cloud based connectivity system having a plurality of wireless devices, the system comprising:
a computing device connected to at least one of the wireless devices, the computing device having a control unit to:
determine future consumption patterns for a wireless device within the plurality of wireless devices by using context information for the wireless device, the context information including location of the wireless device at a specific time, battery level, battery charge time, power charge and discharge rate, bandwidth consumption, content consumption latency, data consumption, and available access points,
create a connectivity representation for the wireless device, and
determine an optimal network topology for the wireless device.

2. The system of claim 1, wherein the control unit is to use the received context information, the future consumption patterns, and information about available network connections to create the connectivity representation.

3. The system of claim 1, wherein the control unit is to receive the context information from the wireless device at predetermined time periods.

4. The system of claim 3, wherein the future consumption patterns include predictions about a remaining battery level and a remaining data capacity at the end of each predetermined time period.

5. The system of claim 1, wherein the control unit is to determine and evaluate a plurality of available topologies based on the connectivity representation to determine the optimal network topology for the plurality of wireless devices.

6. The system of claim 1, wherein the control unit is to issue connectivity commands to each wireless device to implement the determined network topology.

7. A cloud-based connectivity method, the method comprising:
generating a plurality of data frames that include context information for a plurality of wireless devices, the data frames including information about location of the wireless device at a specific time, battery level, battery charge time, power charge and discharge rate, bandwidth consumption, content consumption latency, data consumption, and available access points;

determining a future consumption pattern for a wireless device within the plurality of wireless devices by using the generated data frames;

determining a network connectivity option for the wireless device using the received data frames, the future consumption pattern, and information about available network connections; and selecting an optimal network topology for the wireless device based on the network connectivity option.

8. The method of claim 7, wherein determining the of network connectivity option for the wireless device includes creating a connectivity representation for the wireless device.

9. The method of claim 8, wherein the network connectivity option is generated based on the connectivity representation.

10. The method of claim 7, wherein determining the future consumption pattern further includes using a default data associated with the wireless devices.

11. A non-transitory machine-readable storage medium encoded with instructions executable by a processor of a cloud-based connectivity system, the machine-readable storage medium comprising instructions to:

acquire data from a plurality of wireless devices at predetermined time periods;

generate predictions related to a remaining battery level and a remaining data capacity for each of the wireless devices at the end of each predetermined time period by using the acquired data;

create a connectivity representation for the plurality of wireless devices with the acquired data, the generated predictions, and information about available network connections;

determine and evaluate available network topologies created based on the connectivity representation to determine an optimal network topology for the plurality of wireless devices; and issue connectivity commands to each wireless device based on the determined optimal network topology.

12. The non-transitory machine-readable storage medium of claim 11, further comprising instructions to eliminate topologies that do not meet energy, data, and service requirements to determine the optimal network topology for the plurality of wireless devices.

13. The non-transitory machine-readable storage medium of claim 11, wherein the optimal network topology provides largest bandwidth and lowest content consumption latency for the plurality of wireless devices.

* * * * *